United States Patent
Luedtke et al.

[19]

[11] Patent Number: 5,978,901
[45] Date of Patent: Nov. 2, 1999

[54] FLOATING POINT AND MULTIMEDIA UNIT WITH DATA TYPE RECLASSIFICATION CAPABILITY

[75] Inventors: Mark R. Luedtke, Round Rock; Paul K. Miller, Austin; Chris N. Hinds, Austin; Ashraf Ahmed, Austin, all of Tex.

[73] Assignee: Advanced Micro Devices, Inc., Sunnyvale, Calif.

[21] Appl. No.: 08/916,056

[22] Filed: Aug. 21, 1997

[51] Int. Cl.[6] .................................................. G06F 9/302
[52] U.S. Cl. ........................... 712/222; 712/229; 712/23; 708/495; 708/525
[58] Field of Search ...................................... 395/563, 570, 395/800.23; 712/222, 229, 23; 708/495, 525

[56] References Cited

U.S. PATENT DOCUMENTS

| 4,044,338 | 8/1977 | Wolf | 365/49 |
|---|---|---|---|
| 4,453,212 | 6/1984 | Gaither et al. | 711/2 |
| 4,807,115 | 2/1989 | Torng | 395/391 |
| 4,847,802 | 7/1989 | Ashton | 708/513 |

(List continued on next page.)

FOREIGN PATENT DOCUMENTS

| 0 207 519 | 7/1986 | European Pat. Off. . |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |
| 85/03148 | 7/1985 | WIPO . |

OTHER PUBLICATIONS

IBM Technical Disclosure Bulletin, "Floating Point Data Type Tag," vol. 39, No. 7, Jul. 1996, pp. 265(1 sheet).
Intel, "Chapter 2: Microprocessor Architecture Overview", pp. 2–1 through 2–4.

Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.
"Intel Architecture Software Developers's Manual, vol. 1: Basic Architecture", Intel Corporation, Prospect IL, 1996, 1997, Chapter 8: Programming With The Intel MMX™ Technology, pp. 8–1 through 8–15.
Holstad, S., "Tutorial Tuesday: Decoding MMX" Jan. 14, 1997, Earthlink Network, Inc. copyright 1997, 5 pages (see http://www.earthlink.net/daily/Tuesday/MMX).
"Intel MMX™ Technology—Frequently Asked Questions" 6 pages (see http://www.intel.com/drg/mmx/support/faq/htm), 1997.

*Primary Examiner*—Kenneth S. Kim
*Attorney, Agent, or Firm*—Conley, Rose & Tayon, PC; B. Noel Kivlin

[57] ABSTRACT

A superscalar microprocessor includes a combination floating point and multimedia unit. The floating point and multimedia unit includes one set of registers. The multimedia core and floating point core share the one set of registers. Each register as a type field associated with the register. The type field identifies whether the associated register contains valid data and whether the data is of multimedia type or floating point type. If the register stores floating point type data, the type field further indicates which of a plurality of floating point types the register stores such as: zero, infinity and normal. The floating point core relies on the type field to identify special floating point numbers such as zero and infinity. To ensure predictable results when a floating point instruction is executed subsequent to a multimedia instruction, a retyping algorithm retypes registers typed as multimedia type when the first floating point instruction subsequent to a multimedia instruction is executed. The retyping algorithm reads each register and reclassifies the registers classified as multimedia type. The reclassification algorithm classifies the contents of the register interpreted as floating point data.

19 Claims, 7 Drawing Sheets

U.S. PATENT DOCUMENTS

| | | | |
|---|---|---|---|
| 4,858,105 | 8/1989 | Kuriyama et al. | 395/582 |
| 4,928,223 | 5/1990 | Dao et al. | 395/597 |
| 5,053,631 | 10/1991 | Perlman et al. | 708/508 |
| 5,058,048 | 10/1991 | Gupta et al. | 708/508 |
| 5,129,067 | 7/1992 | Johnson | 395/389 |
| 5,136,697 | 8/1992 | Johnson | 395/586 |
| 5,226,126 | 7/1993 | McFarland et al. | 395/394 |
| 5,226,130 | 7/1993 | Favor et al. | 395/585 |
| 5,268,856 | 12/1993 | Wilson | 708/514 |
| 5,339,266 | 8/1994 | Hinds et al. | 364/748.01 |
| 5,481,489 | 1/1996 | Yanagida | 708/525 |
| 5,560,035 | 9/1996 | Garg et al. | 395/800.23 |
| 5,619,666 | 4/1997 | Coon et al. | 395/384 |
| 5,651,125 | 7/1997 | Witt et al. | 395/394 |
| 5,701,508 | 12/1997 | Glew et al. | 395/800.23 |
| 5,740,441 | 4/1998 | Yellin et al. | 395/704 |
| 5,748,516 | 5/1998 | Goddard et al. | 708/497 |
| 5,751,981 | 5/1998 | Witt et al. | 395/380 |
| 5,805,475 | 9/1998 | Purino et al. | 708/204 |
| 5,825,678 | 10/1998 | Smith | 708/495 |
| 5,828,873 | 10/1998 | Lynch | 395/563 |

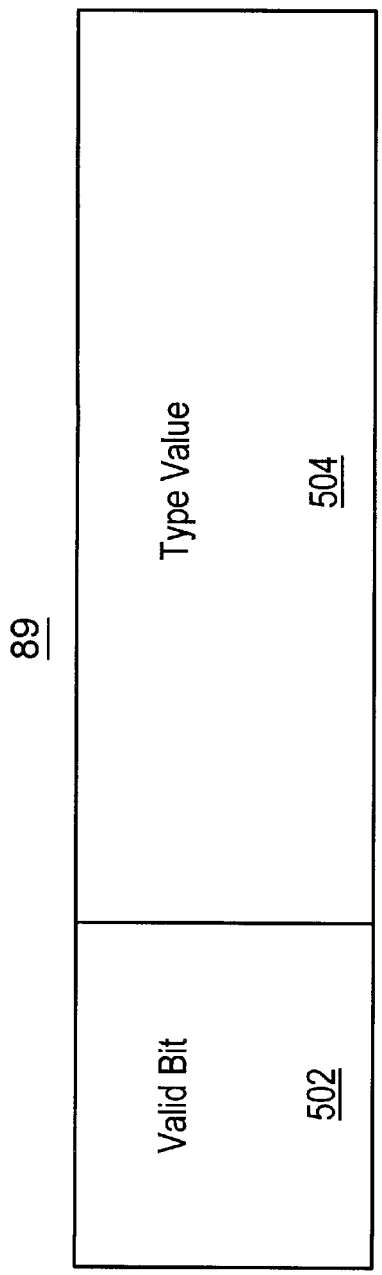

FLOATING POINT AND MULTIMEDIA UNIT WITH DATA TYPE RECLASSIFICATION CAPABILITY

BACKGROUND OF THE INVENTION

1. Field of the Invention

This invention relates to the field of microprocessors and, more particularly, to typing registers within floating point and multimedia instruction units of microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Generally speaking, a pipeline comprises a number of stages at which portions of a particular task are performed. Different stages may simultaneously operate upon different items, thereby increasing overall throughput. Although the instruction processing pipeline may be divided into any number of stages at which portions of instruction processing are performed, instruction processing generally comprises fetching the instruction, decoding the instruction, executing the instruction, and storing the execution results in the destination identified by the instruction.

Microprocessors are configured to operate upon various data types in response to various instructions. For example, certain instructions are defined to operate upon an integer data type. The bits representing an integer form the digits of the number. The binary point is assumed to be to the right of the digits (i.e. integers are whole numbers). Another data type often employed in microprocessors is the floating point data type. Floating point numbers are represented by a significand and an exponent. The base for the floating point number is raised to the power of the exponent and multiplied by the significand to arrive at the number represented. While any base may be used, base 2 is common in many microprocessors. The significand comprises a number of bits used to represent the most significant digits of the number. Typically, the significand comprises one bit to the left of the binary point, and the remaining bits to the right of the binary point. The bit to the left of the binary point is not explicitly stored, instead it is implied in the format of the number. Generally, the exponent and the significand of the floating point number are stored. Additional information regarding the floating point numbers and operations performed thereon may be obtained in the Institute of Electrical and Electronic Engineers (IEEE) Standard 754. IEEE Standard 754 is herein incorporated by reference in its entirety.

Floating point numbers can represent numbers within a much larger range than can integer numbers. For example, a 32 bit signed integer can represent the integers between $2^{31}-1$ and $-2^{31}$, when two's complement format is used. A single precision floating point number as defined by IEEE Standard 754 comprises 32 bits (a one bit sign, 8 bit biased exponent, and 24 bits of significand) and has a range from $2^{-126}$ to $2^{127}$ in both positive and negative numbers. A double precision (64 bit) floating point value has a range from $2^{-1022}$ and $2^{1023}$ in both positive and negative numbers. Finally, an extended precision (80 bit) floating point number has a range from $2^{-16382}$ to $2^{16383}$ in both positive and negative numbers.

The expanded range available using the floating point data type is advantageous for many types of calculations in which large variations in the magnitude of numbers can be expected, as well as in computationally intensive tasks in which intermediate results may vary widely in magnitude from the input values and output values. Still further, greater precision may be available in floating point data types than is available in integer data types.

Several special floating point data representations are defined. These special floating point data representations are referred to as "special floating point numbers." Special floating point numbers may include special encodings for zero, + and − infinity, denormalized numbers, and not a number (NaN). NaNs may include signaling NaNs (SNaNs) and quiet NaNs (QNaNs). Quiet NaNs may be output as a response to an invalid operation or as the result of an operand in which at least one operand is a QNaN. Signaling NaNs are typically not generated by an FPU. A programmer can use an SNaN to trap into the exception handler and the bit combination of the SNaN can be used to pass information to the exception handler. Specific encodings are assigned for each special floating point number. To determine whether a floating point number is a special floating point number, it is necessary to decode the floating point number to determine if the bit pattern (i.e. the bits that comprise the significand, exponent and sign bit) represents a special encoding.

Another data type employed in microprocessors is the multimedia data type. Multimedia numbers are typically operands or results of multimedia extension, or MMX, instructions. MMX instructions are oriented to highly parallel operations, such as video processing, audio processing and graphical data processing. Multimedia operations have typically been handled by separate sound and/or video cards. Handling the multimedia operations on-board the microprocessor can dramatically speed up multimedia applications such as graphics, audio, speech recognition, video and data compression programs.

In one implementation, the circuitry that executes the multimedia instructions uses the same registers as the floating point unit. A register may store either a floating point register value or a multimedia register value.

It is not advisable to use a multimedia register value as an operand to a floating point instruction. The circuitry that executes the floating point instruction may rely upon the type field of an operand to identify whether the operand is a special floating number such as zero or infinity. For example, a multimedia register value may store a bit pattern that corresponds to the bit pattern representation of a floating point infinity. Because the floating point unit may depend upon the type value to identify an operand as infinity, performing a floating point operation on the multimedia register value without the appropriate floating point type may yield unpredictable results. Further, it is undesirable to include logic to decode an encode type value. Extra logic adversely effects the frequency of the processor.

To prevent the undesirable effects of performing floating point operations on multimedia registers, an instruction is defined to purge multimedia data, or empty the multimedia state, from the registers. For example, the instruction may mark all registers as empty. If a floating point instruction attempts to perform an operation on a register marked as empty, an overflow or underflow stack exception is generated. Ideally, the instruction that purges the multimedia data, or empties the multimedia state, is executed prior to any floating point operation that follows a multimedia operation. However, a situation is contemplated where a user or programmer will inadvertently or purposely fail to execute the empty multimedia state instruction prior to executing a floating point instruction. What is desired is a method and apparatus that ensures predictable results when executing a floating point operation following a multimedia operation independent of a user's or programmer's actions.

SUMMARY OF THE INVENTION

The problems outlined above are in large part solved by a method and apparatus for typing registers in accordance with the present invention. A combination floating point and multimedia unit includes one set of registers used by both a floating point core and a multimedia core. Each register has a type field associated with the register. The type field may include a valid bit and a type value. The valid bit indicates whether the associated register is empty or contains a valid register value. If the set of registers are used as a register stack, the valid bit identifies which stack locations are storing valid data. If the registers are used as a register file, the valid bits are typically all set to valid. Each register additionally has a type value associated with the register. The type value contains information about the bit pattern stored in a register. For example, the type value may identify the bit pattern stored in a register as a special floating point number or a normal floating point number. In the present invention, the type value additionally may identify the bit pattern as a multimedia number. When a multimedia operand or result is stored to a register, a multimedia bit of the type value may be asserted to identify the bit pattern as a multimedia number.

When a multimedia instruction is executed subsequent to a floating point instruction, the valid bits for each register are set to indicate that the registers are non-empty or valid. Setting all the valid bits converts the set of registers from a register stack to a register file. As a multimedia result is stored to a register, the type value may be set to identify the register as storing multimedia data. For example, a multimedia bit of the type value may be set and special floating point type bits cleared, when a multimedia result is stored to a register.

When a floating point instruction is executed subsequent to a multimedia instruction, a retyping routine is run to modify the type values of registers that are typed as multimedia data. The retyping is based on the bit patterns stored in the register. The retyping routine retypes the contents of the register interpreted as floating point data. For example, the bit pattern of a multimedia register value may be the same bit pattern defined as a floating point infinity by IEEE Std. 754. Accordingly, when the retyping routine is run, the register is typed as a special floating point number, or more precisely as a floating point infinity. The present invention advantageously ensures that operands to a floating point instruction are properly typed as floating point data. Because the floating point instruction unit may rely upon the type value to identify whether the floating point operand is a special floating point number, proper typing of floating point operands is often necessary.

Broadly speaking, the present invention contemplates a floating point and multimedia unit comprising a register storage device, a floating point core, a multimedia core, and a reclassifier. The register storage device includes a register field configured to store a register value and a type field configured to store a valid bit and a type value. The valid bit is indicative of whether the register field is empty and the type value is indicative of a type of register value stored in the register field. The floating point core is coupled to the register storage device and configured to execute floating point instructions. The multimedia core is coupled to the register storage device and configured to execute multimedia instructions. The multimedia core is configured to receive a multimedia operand from the register storage device and to store a multimedia result to the register storage device. The reclassifier is coupled to the register storage device. The type value is set to indicate a result of a multimedia instruction is a multimedia type when the result is stored in the register field. When a floating point instruction is executed subsequent to the multimedia instruction, the re-classifier reclassifies the type value marked as multimedia type based on a bit pattern of the register value.

The present invention further contemplates a method for correctly typing registers when switching between floating point instructions and multimedia instructions including: receiving a floating point instruction; setting a type of multimedia results stored in a register device as a multimedia type; retyping register values of the register device typed as the multimedia type as a floating point type based on bit patterns of the register values; and executing the floating point instruction.

BRIEF DESCRIPTION OF THE DRAWINGS

Other objects and advantages of the invention will become apparent upon reading the following detailed description and upon reference to the accompanying drawings in which:

FIG. 5 is a diagram of one embodiment of a type field in accordance with the present invention.

FIG. 6 is a diagram of one embodiment of a type field in accordance with the present invention.

Figure 1:
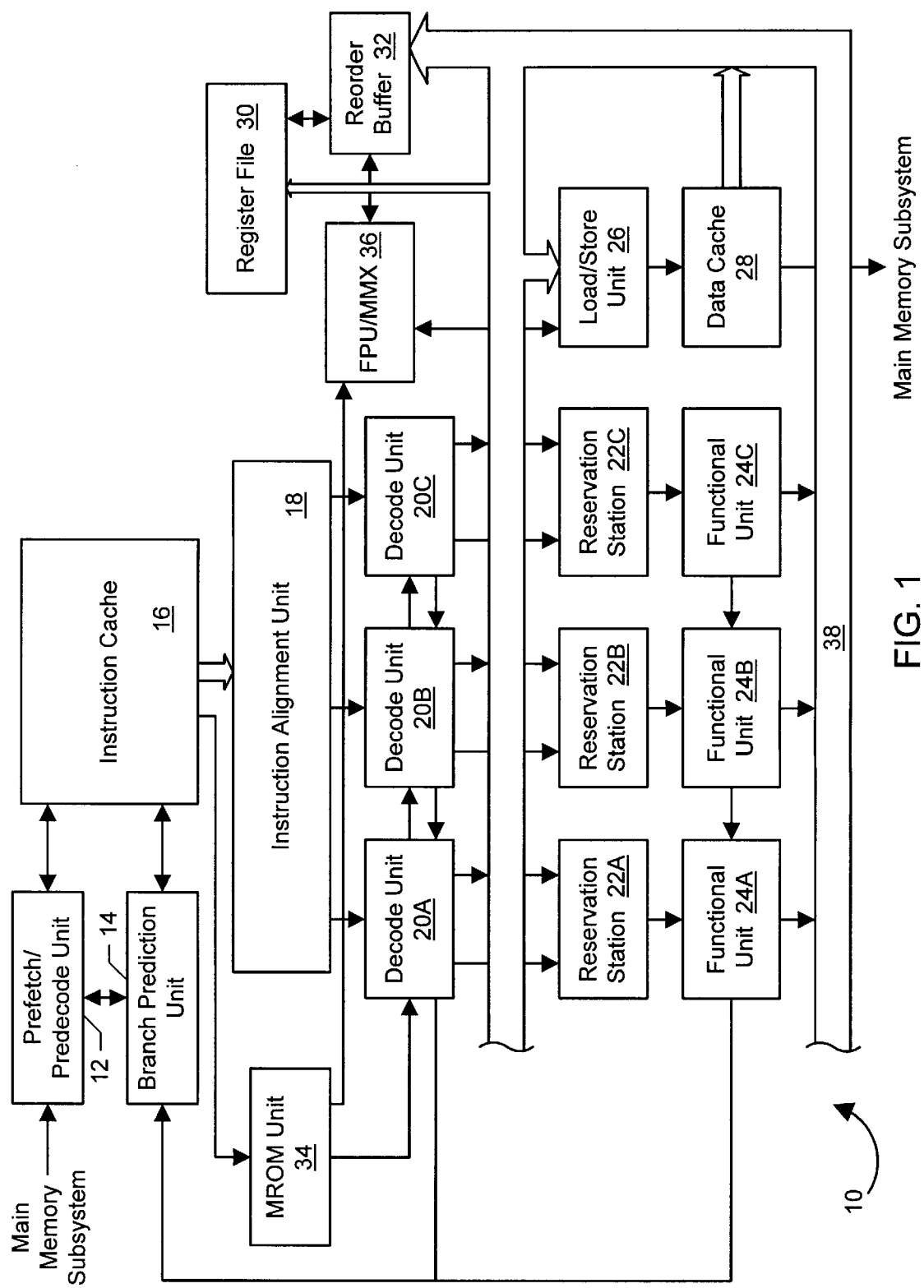
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point and multimedia unit (FPU/MMX 36. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34 is coupled to decode units 20 and FPU/MMX 36. Finally, FPU/MMX 36 is coupled to load/store unit 26 and reorder buffer 32.

According to one embodiment of microprocessor 10, floating point instructions are classified as MROM (i.e. microcode) instructions for instruction fetching and dispatch purposes in instruction cache 16. Floating point instructions are routed to MROM unit 34. MROM unit 34 parses a floating point instruction into a floating point operation which is transmitted to FPU/MMX 36 and one or more load/store operations for load/store unit 26 to perform to retrieve memory operands for the instruction. As used herein, a "memory operand" of an instruction is an operand which is stored in a memory location (as opposed to a register within microprocessor 10). The memory operand is located via an address formed by adding one or more of the following: the contents of one or two registers, an immediate field of the instruction, and a displacement field of the instruction.

In a similar manner to floating point instructions, in one embodiment, multimedia instructions are classified as MROM instructions for instruction fetching and dispatch purposes. The multimedia instructions are routed to MROM unit 34 which parses the multimedia instruction into a multimedia operation which is transmitted to FPU/MMX 36 and one or more load/store operations for load/store unit 26 to perform.

In one embodiment, FPU/MMX unit 36 receives and executes both floating point and multimedia instructions. In one particular embodiment, the resources within FPU/MMX 36 are shared by both a floating point core and a multimedia core. Accordingly, FPU/MMX 36 contains one input buffer, one set of registers and one output buffer. The majority of the microprocessor handles multimedia instructions in the same manner as floating point instructions. As noted above, multimedia instructions are routed to MROM unit 34 which parses the multimedia instruction into a multimedia operation and one or more load/store operations.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fastpath" instructions. The remaining x86 instructions are referred to as MROM instructions, according to one embodiment. For fastpath instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fastpath instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fastpath instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fastpath instructions to effectuate the desired operation. If the MROM instruction is a floating point instruction, the fastpath instructions may include a floating point operation. MROM unit 34 dispatches the subset of fastpath instructions to decode units 20. A listing of exemplary x86 instructions categorized as fastpath instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
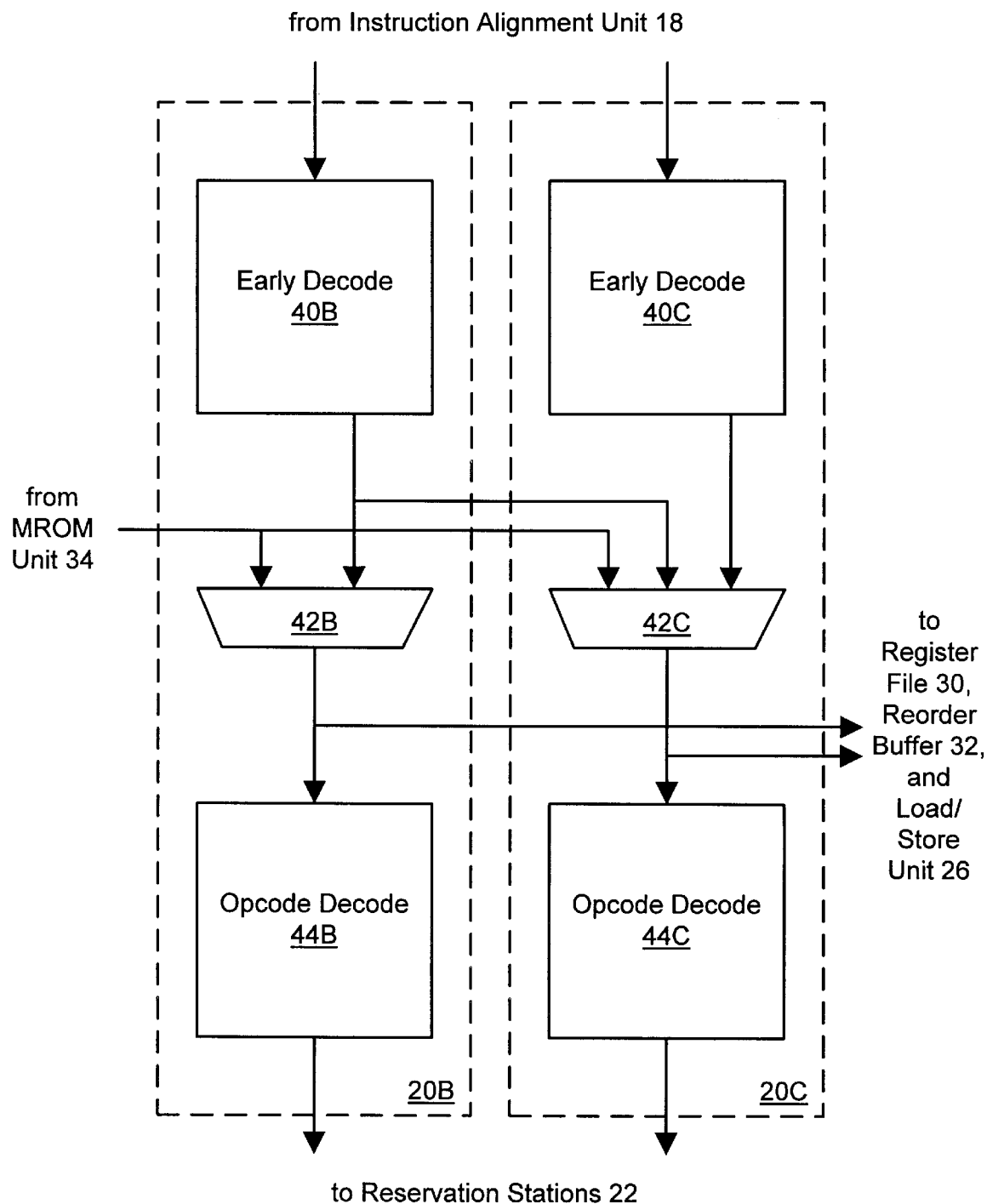
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fastpath instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fastpath instruction decoded by decode unit 20B to be dispatched concurrently with a double dispatch instruction decoded by decode unit 20A

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
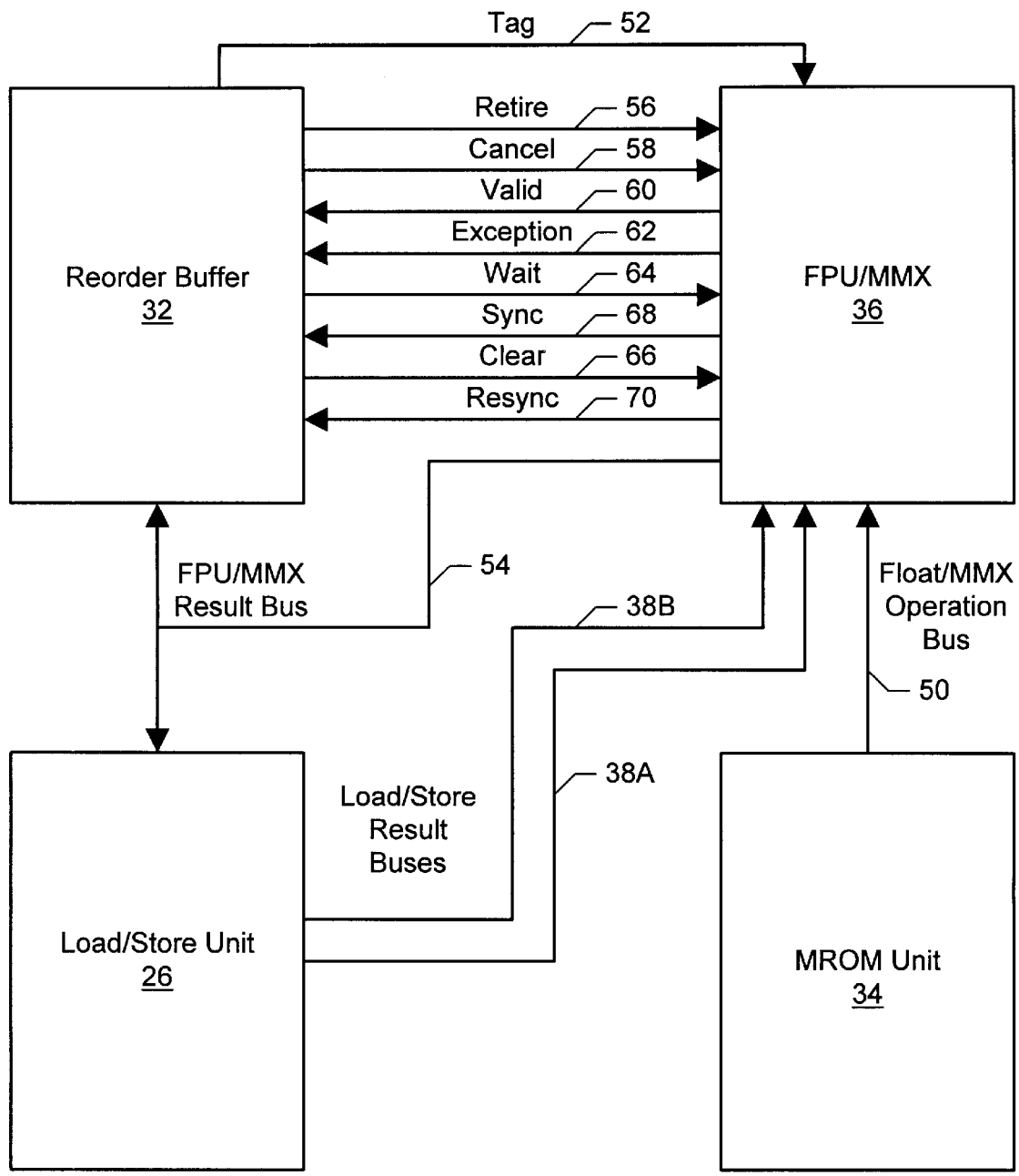
FIG. 3 is a block diagram of a floating point unit, a reorder buffer, a load/store unit, and an MROM unit shown in FIG. 1, highlighting interconnection therebetween according to one embodiment of the microprocessor.

Turning now to FIG. 3, a block diagram of load/store unit 26, reorder buffer 32, FPU/MMX 36, and MROM unit 34 is shown. Interconnection between the blocks is highlighted in FIG. 3 according to one embodiment of microprocessor 10. Additional interconnection may be provided as desired according to design choice.

As discussed above, MROM unit 34 receives floating point instructions and multimedia instructions from instruction cache 16 and parses the instructions into a floating point operation or a multimedia operation, and memory operations to retrieve and store memory operands for the instructions. Additionally, certain instructions may require activity other than memory operations from functional units 24. For example, a floating point instruction defined to store the floating point state to a set of memory locations may access one or more registers which are not configured into FPU/MMX 36. As a more particular example, the instruction pointer may be maintained within reorder buffer 32 according to one embodiment, and the instruction pointer is part of the floating point state. MROM unit 34 parses such instructions into integer instructions to be executed by functional units 24.

MROM unit 34 provides the floating point or multimedia operation upon a float/MMX operation bus 50 coupled between MROM unit 34 and FPU/MMX 36. Each operation includes an opcode, which defines the requested operation and register specifiers for any register operands used by the instruction. The memory operand, if one is included in the instruction, is provided by load/store unit 26. Concurrent with MROM unit 34 providing the floating point or multimedia operation to FPU/MMX 36, MROM unit 34 provides the memory operation instructions between early decode units 40 and opcode decode units 44, as shown in FIG. 2. Reorder buffer 32 provides the reorder buffer tag assigned to the memory operations upon a tag bus 52 coupled between reorder buffer 32 and FPU/MMX 36. According to the present embodiment, reorder buffer 32 is a line-oriented reorder buffer as described above. For such an embodiment, reorder buffer 32 provides the line tag upon tag bus 52. Using the supplied tag, FPU/MMX 36 can identify the memory operand data as it is provided from load/store unit 26.

Load/store unit 26 provides memory operand data upon load/store result bus 38A and 38B. Result buses 38A and 38B comprise a portion of result buses 38. Alternatively, load/store result buses 38A and 38B may comprise dedicate buses for providing values to FPU/MMX 36. Each load/store result bus 38A and 38B is capable, in one embodiment, of providing a 32 bit data word and a reorder buffer tag identifying the data word. The reorder buffer tag comprises both the line and offset portions. The line portion identifies the floating point instruction to which the data word belongs, and the offset portion defines the portion of the memory operand being provided by the data word. A floating point memory operand may comprise as many as 80 bits, requiring up to two 32 bit data words and a 16 bit data word from load/store unit 26. A multimedia memory operand may comprise 64 bits, requiring two 32 bit data words from load/store unit 26.

FPU/MMX 36 may provide results to either reorder buffer 32 or load/store unit 26. For example, a destination for an instruction may be a memory location. FPU/MMX 36 communicates the result of the instruction upon FPU/MMX result bus 54 to load/store unit 26 for storage. Additionally, a floating point instruction is defined which causes a floating point value to be stored into an integer register (specifically, the AX register of the x86 microprocessor architecture, in one embodiment). FPU/MMX result bus 54 is therefore coupled to reorder buffer 32. The floating point and multimedia (FPU/MMX) registers are configured within FPU/MMX 36, allowing results to be stored therein for instructions having targets within the FPU/MMX registers.

Reorder buffer 32 coordinates the in-program-order retirement of instructions. Since instructions often retire within FPU/MMX 36, an interface between reorder buffer 32 and FPU/MMX 36 is used for communicating the retirement of floating point and multimedia instructions. The interface provides a loose coupling between FPU/MMX 36 and reorder buffer 32 such that one unit can get "ahead of" the other. For example, reorder buffer 32 may indicate that a particular instruction can be retired and FPU/MMX 36 may not yet have executed the instruction. FPU/MMX 36 may accept a retirement indication for the instruction if the instruction will not create an exception, and retire the instruction internal to FPU/MMX 36 upon completion. Similarly, FPU/MMX 36 can complete instructions and buffer them internally until a reorder buffer 32 retires (or cancels) the instructions.

The signals employed according to one embodiment of the loosely coupled interface are shown in FIG. 3. A retire signal is conveyed by reorder buffer 32 upon a retire conductor 56 coupled to FPU/MMX 36. Reorder buffer 32 conveys a cancel signal upon a cancel conductor 58 coupled to FPU/MMX 36. FPU/MMX 36 conveys a valid signal upon a valid conductor 60 and an exception signal upon an exception conductor 62, both of which are coupled to reorder buffer 32. Reorder buffer 32 provides a wait signal upon a wait conductor 64 and a clear signal upon a clear conductor 66, both of which are coupled to FPU/MMX 36. Finally, FPU/MMX 36 provides a sync signal upon a sync conductor 68 and a resync signal upon a resync conductor 70, both of which are coupled to reorder buffer 32.

The retire, cancel, valid, and exception signals provide the basic interface for retiring and canceling instructions. Reorder buffer 32 asserts the retire signal when a instruction is to be retired. The retire signal is asserted for each instruction in program order, allowing a single signal to be used. Alternatively, an instruction can be canceled (i.e. discarded from the execution pipeline within FPU/MMX 36) via assertion of the cancel signal. FPU/MMX 36 may be configured to store an assertion of the retire signal until the corresponding instruction is completed by FPU/MMX 36 (i.e. until the instruction exits the execution pipeline of FPU/MMX 36). Once the retire signal has been asserted for a given instruction, FPU/MMX 36 may proceed with updating the destination register with the result of the instruction (provided certain floating point exceptions are masked).

FPU/MMX 36 provides the status of each instruction using the valid signal and the exception signal. If an instruction completes without creating an exception, the valid signal is asserted for that instruction. If the instruction does create an exception, the exception signal is asserted. Similar to the retire signal assertions, assertions of the valid and/or exception signals are queued by reorder buffer 32 and associated with floating point instructions in program order.

The wait and sync signals are used to implement a synchronization instruction (e.g. FWAIT in the x86 microprocessor architecture). A synchronization instruction is used to synchronize the floating point/multimedia and the integer portions of microprocessor 10. Particularly, floating point/multimedia exceptions are inexact. The synchronization instruction can be used to check for any exceptions with respect to a particular instruction. When the synchronization instruction is ready to be retired, reorder buffer 32 asserts the wait signal. FPU/MMX 36 asserts the sync signal when FPU/MMX 36 is synchronized. Upon assertion of both signals, the synchronization instruction is complete.

The resync signal is used to delete speculative state (i.e. discard any remaining instructions within reorder buffer 32) and refetch instructions starting with the next instruction after the instruction which is foremost, in program order, within reorder buffer 32. The foremost instruction within reorder buffer 32 is retired. The clear signal is used by reorder buffer 32 in a similar fashion: if the clear signal is asserted, FPU/MMX 36 deletes any speculative state stored therein.

Figure 4:
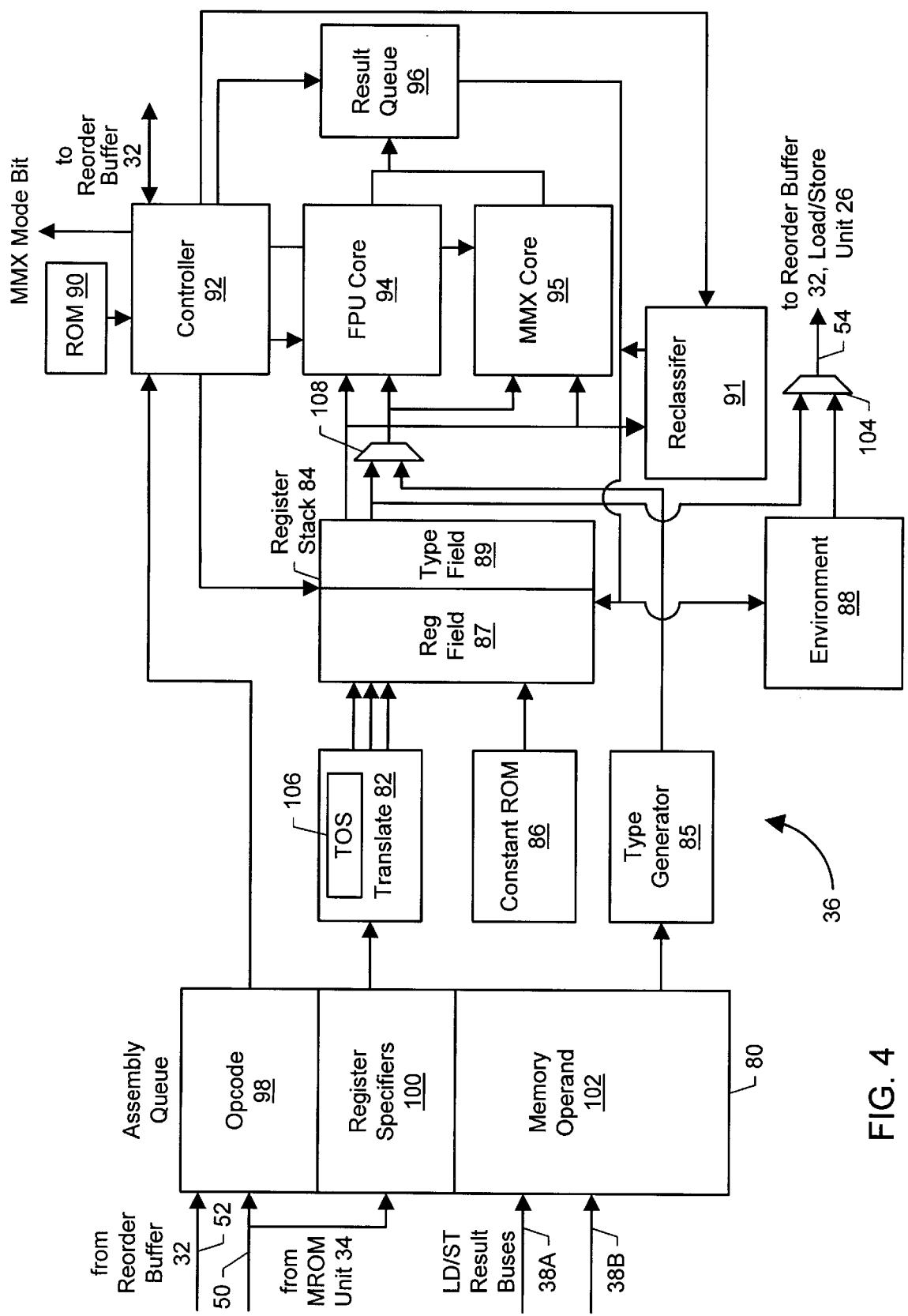
FIG. 4 is a block diagram of one embodiment of a floating point/multimedia unit in accordance with the present invention.

Turning next to FIG. 4, a block diagram of one embodiment of FPU/MMX 36 is shown. As shown in FIG. 4, FPU/MMX 36 includes an assembly queue 80, a translate unit 82, a register storage 84, a type generator 85, a constant read-only memory (ROM) 86, an environment unit 88, an ROM 90, a reclassifier 91, controller 92, an FPU core 94, an MMX core 95 and a result queue 96. In the illustrated embodiment, FPU/MMX 36 handles both floating point and multimedia instructions. FPU core 94 and MMX core 95 share the same resources, such as, register storage 84, controller 92 and result queue 96.

Assembly queue 80 comprises multiple queue entries, each of which is configured to store instruction information corresponding to one instruction. As shown in FIG. 4, assembly queue 80 includes several fields for each entry. An opcode field 98 is included for storing the opcode of an instruction and the corresponding reorder buffer tag and a stack specifiers field 100 is included for storing register specifiers which select storage locations within register storage 84. The selected registers provide operands for the corresponding instructions. The values stored in opcode field 98 and stack specifier field 100 are received by FPU/MMX 36 upon float/M operation bus 50 from MROM unit 34 and tag bus 52 from reorder buffer 32. Assembly queue 80 further includes a memory operand queue 102 for storing a memory operand used by the instruction. The memory operand is received upon load/store result buses 38A and 38B.

Assembly queue 80 is coupled to controller 92, to translate unit 82, and to type generator 85. Translate unit 82 is coupled to register storage 84, which is further coupled to constant ROM 86, result queue 96, FPU core 94, MMX core 95 and reclassifier 91. Environment 88 is coupled to result queue 96 and is coupled to provide, through multiplexor 104, a result upon FPU/MMX result bus 54. Register storage 84 may also provide a result upon FPU/MMX result bus 54 through multiplexor 104. Controller 92 is coupled to ROM 90, result queue 96, reclassifier 91, MMX core 95 and FPU core 94. FPU core 94 and MMX core 95 are further coupled to result queue 96. Reclassifier 91 is coupled to an output and an input of register storage 84. Control 92 is further coupled to receive the signals forming the interface between FPU/MMX 36 and reorder buffer 32 (e.g. the signals upon conductors 52, 56, 58, 60, 62, 64, 66, 68, and 70).

Generally speaking, instructions and their corresponding memory operands are received into assembly queue 80. Instructions are dispatched from assembly queue 80 into the execution pipeline of FPU 36. FPU instructions are executed by FPU core 94, and MMX instructions are executed by MMX core 95. Upon exit from the execution pipeline, the results of the instructions are stored into result queue 96. The results are held in result queue 96 until a retire indication is received from reorder buffer 32. Upon receipt of the retire indication, the results are stored into register storage 84 (or FPU environment 88, if the destination of the instruction is an FPU environment register such as the control word or the status word).

Translate unit 82 provides the translated register specifiers to register storage 84, which reads the values from the corresponding register locations and provides the register values and the associated type values to FPU core 94 or MMX core 95. Register storage 84 includes the architected FPU/MMX registers defined by the microprocessor architecture employed by microprocessor 10. For example, embodiments of microprocessor 10 employing the x86 microprocessor architecture include eight architected registers within register storage 84. Additionally, register storage 84 may include temporary registers for use by microcode routines stored in ROM 90, as described below. In one embodiment, 24 temporary registers are included.

Register storage 84 includes a register field 87 and a type field 89. Register field 87 contains a plurality of register. Each register is configured to store a plurality of bits referred to as a register value. Type field 89 is configured to store a plurality of valid bits and type values associated with the register values in register field 87. In one embodiment, the type field contains valid bits and a type values. The valid bits indicate whether the registers associated with the valid bits contains a valid register value. The valid bits may be used to configure register storage 84 as a register stack. As a register value is pushed on the stack, the valid bit of the register to which the register value is pushed is asserted. Similarly, when a register value is popped from the stack, the valid bit associated with the register from which the register value is popped is deasserted indicating that the register is empty, or does not contain a valid register value. If a register with a deasserted valid bit is attempted to be accessed, an underflow or overflow stack exception is generated. In an alternative embodiment, register storage 84 is configured as a register file. In this embodiment, the valid bits may all be asserted, which indicates that each register contains valid data. In this embodiment, instructions may read the data from any register without overflow or underflow stack exceptions.

The type values identify particular bit combinations of a register value. In one embodiment, each type values includes a plurality of bits, each bit identifies a particular type. For example, the type bits may identify whether the associated register value contains a bit pattern that represents a floating point zero, a floating point infinity, an illegal or invalid floating point type, a normal floating point type or a multimedia type. As noted above, zero, infinity and invalid are types of special floating point numbers. The type bits may be used by the floating point core or the multimedia core to identify characteristics of a register value. For example, special rules exist within the floating point core for multiplication and division involving a floating point zero. Although the floating point core could detect whether an operand is a floating point zero by decoding the bits of the operand, the floating point core may rely upon the type bits to identify the operand as a floating point zero. Relying on the type value eliminates the step of decoding the register value each time it is used. If a floating point operation is performed on a register value that represents a floating point zero but is not properly marked as a floating point zero, unpredictable results may occur. Accordingly, it is necessary when performing floating point operations that the type value properly interprets the bit pattern stored in register field 87 as a floating point data.

The x86 architecture defines a floating point tag word to identify the contents of the eight architectural floating point registers. The tag word includes a two-bit tag for each register. The tag word identifies whether each register is valid, zero, special or empty. In one embodiment, the tag word is derived from information stored in tag field 89. In this embodiment, the tag word is not a separate physical entity. When the tag word is read, data from tag field 89 is decoded to yield the necessary information. If the valid bit of a register is deasserted, the tag word indicates that the register is empty. If the valid bit is asserted, the type field identifies whether the tag word is valid, zero or special. If the type field indicates a floating point zero, the tag word identifies zero. If the type fields indicate a floating point special other than zero, the tag word identifies special. If the type field identifies normal or multimedia type, the tag word identifies valid.

As discussed above, one type identified by the type value is a multimedia type. The multimedia type may identify multimedia operands loaded from memory and results of multimedia operations store in the register file. In one embodiment, two different load instructions are defined: a floating point load and a multimedia load. Memory operands loaded using a floating point load are typed as a floating point number by type generator 85. For example, type generator 85 may decode the memory operand to determine whether the operand is zero, infinity, NaN, invalid, or a normal floating point number. In contrast, an operand loaded using a multimedia load operation is typed by type generator 85 as multimedia type. Similarly, results of floating point instructions are typed as floating numbers (either normal or one of the special floating point numbers), and results of multimedia instructions are typed as multimedia numbers. In one embodiment only one multimedia type is defined. In other embodiments, a plurality of multimedia types may be defined. In this embodiment, type generator 85 classifies the memory operand as one of the multimedia types.

As noted above, in one embodiment, register storage 84 may be configured as a register stack when executing floating point instructions. Accordingly, certain instructions are defined to push a value onto or pop a value from the stack. Pushing a value onto the stack comprises storing the value into a register adjacent to the register which is currently the top of the stack and making that adjacent register the top of the stack. Popping a value from the stack comprises reading the value from the register which is currently the top of the stack and making the stack pointer indicate an adjacent register. Most of the floating point instructions use stack-relative register specifiers (i.e. the specifier indicates the register which is the top of the stack or the register which is at a particular offset from the top of the stack). Therefore, the register specifier is somewhat dependent upon the instructions which execute prior to that instruction (since these instructions may affect which register is the top of the stack). Translate unit 82 maps the stack specifiers to the registers within register storage 84 based upon a speculative top of stack value which reflects execution of the instructions prior to a particular instruction in program order (including the instructions still within the execution pipeline of FPU/MMX 36). A top of stack (TOS) register 106 is included for storing the top of stack indicator. Additionally, a table is provided within translate unit 82 for mapping each register to its stack relative position. Registers may become out of order in the stack due to an exchange instruction which exchanges the contents of a pair of registers. Such an instruction may be implemented by swapping their addresses within the table instead of physically swapping the contents of the corresponding registers. In an alternative embodiment, register storage 84 is configured as a register file. In this embodiment, translate 82 decodes the register specifier to address one of the registers within register storage 84.

The memory operand for the instruction may be substituted for one of the operands from register storage 84 via multiplexor 108. Memory operand field 102 stores memory operands for floating point and multimedia instructions. Memory operands are received from load/store result buses 38A and 38B. In one embodiment, memory operands are conveyed to type generator 85. Type generator 85 generates a type value for the memory operand. The type value, similar to the type value discussed above in reference to register storage 84, may indicate whether the memory operand is a normal floating point number, a special floating point number, or a multimedia number. A memory operand is conveyed to type generator 85 when the instruction corresponding to the memory operand is dispatched into the execution pipeline. The memory operand and the type value associated with the memory operand are conveyed to FPU core 94 or MMX core 95 via multiplexor 108. In one embodiment, type generator 85 generates the type value in parallel with translate unit 82 translating the register specifiers.

FPU core 94 includes the hardware used to manipulate the source operands of the floating point instruction in order to produce the result of the instruction. For example, FPU core 94 includes a multiplier for multiplying the input operands, an adder for adding the input operands, etc. FPU core 94 routes the operands to the various pieces of hardware in response to control signals from controller 92. Certain floating point instructions may not use any of the hardware at a particular stage of the execution pipeline. These instructions are routed around the particular stage, so as to exit the execution pipeline more rapidly.

MMX core 95 includes the hardware used to manipulate the source operands of a multimedia instruction in order to produce the result of the instruction. For example, MMX core 95 may include shift logic for shifting input operands, comparison logic for comparing input operands, etc. MMX core 95 routes the operands to various pieces of hardware in response to control signals from controller 92. Controller 92 receives the opcode for a given instruction from assembly queue 80 and routes the instruction to the MMX core execution pipeline accordingly. Certain instructions may not use any of the hardware at a particular stage of the execution pipeline. These instructions are routed around the particular stage, so as to exit the MMX core execution pipeline more rapidly.

Controller 92 receives the opcode for a given instruction from assembly queue 80. If the instruction is a floating point instruction, controller 92 routes the instruction to FPU core 94 and through the execution pipeline accordingly. If the instruction is a multimedia instruction, controller 92 routes the instruction to MMX core 95. Additionally, controller 92 handles the interface to reorder buffer 32 and communicates with other elements of FPU/MMX 36 according to communications upon the interface. For example, when a particular instruction receives a retire indication, controller 92 communicates with result queue 96 to cause the corresponding instruction result to be stored into register storage 84. If the instruction has not yet been completed, result queue 96 queues the retire indication until the instruction is completed.

Floating point instructions are classified by FPU/MMX 36 into one of two types, according to the present embodiment. The first type (referred to herein as "basic") includes instructions which provide a basic arithmetic operation (such as multiply, add, etc.) or a data movement instruction. Generally, the basic instructions can be completed with one pass through the execution pipeline. On the other hand, the second type (referred to herein as "transcendental") includes instructions which perform a more abstract mathematical function. For example, the transcendental instructions may include the sine and cosine functions, as well as functions such as logarithm and square root. The transcendental functions are implemented using microcoded routines stored in ROM 90. Effectively, the transcendental instructions make multiple passes through the execution pipeline in order to complete. Intermediate results are calculated by the instructions within the microcoded routine, and the final result is formed by calculating upon the intermediate results.

In the embodiment illustrated in FIG. 4, FPU core 94 and MMX core 95 share one set of registers. In this embodiment, problems may occur if floating point instructions use operands that are identified as multimedia type. As discussed above, FPU core 94 may rely on the type field associated with a register to identify special floating point numbers such as zero and infinity. A register may contain a multimedia register value with the same bit representation as a special floating point number. The type field of the multimedia register value, however, may identify the register value as a multimedia type. If FPU core 94 attempts to perform a floating point operation using that register value, unpredictable results may occur because the type field fails to identify the bit pattern as a special floating point number. The above described anomaly may occur when floating point instructions are executed subsequent to multimedia instructions. In an attempt to prevent anomalous results, an instruction is defined to empty the multimedia state prior to executing floating point instructions. This instruction is called EMMS.

The EMMS instruction deasserts the valid bits of all registers within register storage 84. The effect of the EMMS instruction is to empty the register file. Although the instruction does not affect the contents of register storage 84, the registers are all marked, or typed, as empty. All floating point operands must be loaded after the EMMS instruction and those operands are properly typed as floating point types by type generator 85. Accordingly, if the EMMS instruction is executed subsequent to a multimedia instruction and prior to a floating point instruction, the anomalous results discussed above may be avoided.

A situation is contemplated, however, where a user will not comply with the recommended practice of executing the EMMS instruction when switching from multimedia instructions to floating point instructions. For example, a programmer may seek to avoid the expense of emptying the multimedia state (which empties the register file) prior to executing a floating point instruction. For example, if several floating point memory operands have been loaded into register storage 84 and one multimedia instruction is desired to be executed in the middle of a sequence of floating point instructions. Executing the EMMS instruction after the multimedia instruction will empty all the memory operands stored in register storage 84. Therefore, memory operands must be subsequently loaded from memory, which requires a significant number of clock cycles. In an attempt to avoid the overhead described above, a user may attempt to execute the floating point instructions subsequent to a multimedia instruction without executing the EMMS instruction. Although the user may not purposefully use a register storing a multimedia operand, it is desired to design FPU/MMX 36 such that predictable results are obtained when a floating point instruction is executed subsequent to a multimedia instruction regardless of which registers are used and regardless of the user's actions.

When a multimedia instruction is executed subsequent to a floating point instruction, several events may occur. The first multimedia instruction causes the MMX mode bit to be asserted and the valid bit of each register within register storage 84 to be asserted. Asserting the valid bit of each register within register storage 84 has the effect of marking the registers as non-empty and register storage 84 is converted from a register stack to a register file. Subsequent multimedia instructions will be able to read the data from any register without overflow or underflow stack exceptions. There is no recommended or required instruction to be used in the transition from floating point to multimedia instructions As results of multimedia instructions are stored to register storage 84, the type field of the registers to which the results are stored are set to multimedia type.

When a floating point instruction is executed subsequent to a multimedia instruction, the following actions are taken. The first floating point instruction causes the MMX bit to be deasserted and a retyping routine to be executed. The retyping routine reads the type field of each register within register storage 84. If the type field identifies the register as multimedia type, the routine retypes the register as a floating point type based on the bit pattern stored in the register. In one embodiment, multimedia register values are 64-bits and register field 87 is configured to store 80 bit extended floating point number. In one particular embodiment, a 64-bit multimedia register value is stored in the 64-bit significand field of a register and the exponent and sign bits are forced to ones. In this particular embodiment, the retyping is based on the contents of the 64-bit significand. The following table illustrates one embodiment of the retyping of a multimedia register based on the bit pattern stored in the 64-bit significand.

TABLE 1

| Bit 63 | Bit 62 | Bit 61:0 | New Type |
|--------|--------|----------|----------|
| 0 | 0 | all zero | Pseudo inf (Illegal) |
| 0 | 0 | non-zero | Pseudo NaN (Illegal) |
| 0 | 1 | any | Pseudo NaN (Illegal) |
| 1 | 0 | all zero | Infinity |
| 1 | 0 | non-zero | SNAN |
| 1 | 1 | any | QNAN |

After the retyping, the type bits properly identify the bit patterns within register storage 84 interpreted as floating point data. Accordingly, any floating point instructions using the register values in register storage 84 will receive the proper type bits.

The EMMS instruction is considered a floating point instruction. Therefore, if the EMMS instruction is executed subsequent to a multimedia instruction, the retyping routine is executed. Accordingly, after executing the EMMS instruction, the valid bit of each register is deasserted and the type bits identify the bit representation stored in register field 87 interpreted as floating point data.

If the EMMS instruction is not executed subsequent to a multimedia instruction and prior to a floating point instruction, the retyping algorithm still occurs when the first floating point instruction is executed. If the EMMS instruction is not executed, however, the valid bits of the registers within register storage 84 will be asserted. Accordingly, the register stack will appear full and the type bits of the register values will represent the bit patterns within the register field interpreted as floating point numbers. Accordingly, FPU core 94 may use the register values within register storage 84 as operands for floating point instructions.

In the illustrated embodiment, reclassifier 91 performs the retyping routine. Reclassifier 91 is coupled to controller 92 and register storage 84. When controller 92 detects a floating point instruction subsequent to a multimedia instruction, controller 92 conveys a signal to reclassifier 91 to begin the retyping routine. Reclassifier 91 reads each register field 87 and type field 89 from register storage 84. If the type field identifies the register value as a multimedia type, reclassifier 91 classifies the bit pattern stored in register field 87 as a floating point type. For example, reclassifier 91 may classify the bit pattern as an illegal value, an infinity, a SNAN or a QNAN. Reclassifier 91 then stores the reclassified type field in type field 89.

Floating point save (FSAVE) and floating point store environment (FSTENV) instructions may be executed during a multimedia instruction stream without effecting the valid bits. In one embodiment, these instructions are expected to save or store the environment in terms of a floating point environment. In other words, the type fields should reflect the bit patterns interpreted as a floating point number. Accordingly, the FSAVE instruction and FSTENV instruction trigger the retyping algorithm. In this manner, the type fields reflect the contents of the registers interpreted as floating point data.

The microcoded routines may make use of a set of constants stored in constant ROM 86. The constants stored in constant ROM 86 are useful in calculating results for the transcendental instructions. Additionally, the constants may be useful in calculating the results of operations with special floating point numbers as operands. For example, the floating point representations of 1, 0, −1, Pi etc., as well as constants particular to the microcoded routines may be stored in constant ROM 86. The constants may be loaded into temporary registers for use by the microcoded routines. According to one embodiment, constant ROM 86 stores 128 double precision constants and 64 single precision constants.

Environment 88 stores control and status information regarding the state of FPU/MMX 36. A control word may be stored which indicates the rounding and precision modes of FPU/MMX 36 as well as a mask for various exceptions. A status word may also be stored which indicates which exceptions have been detected, the top of stack pointer, etc.

According to one particular embodiment, FPU/MMX 36 executes instructions in program order. The instructions are received into assembly queue 80 in program order, and are provided into the execution pipeline of FPU/MMX 36 in program order as well. An instruction may be ready for execution within assembly queue 80 (i.e. all operands provided) but may remain stored therein because another instruction prior the instruction in program order is not ready for execution. In other words, assembly queue 80 operates as a first-in, first-out (FIFO) buffer. Similarly, results are stored from result queue 96 into register storage 84 and/or environment 88 in program order.

Turning now to FIG. 5, one embodiment of the valid bit and type value of type field 89 are illustrated. As discussed above, valid bit 502 indicates whether valid data is stored in the register field associated with the type field. In floating point mode, the valid bit identifies which stack registers contain a valid register value. In multimedia mode, all valid bits are asserted indicating that each register may store a valid multimedia register data. Type bits, or type field, 504 identify the type of data stored in the register associated with a type field. In one embodiment, type bits 504 include a multimedia (MMX) bit and a plurality of floating point bits. If a register value stores a multimedia operand or result, the multimedia bit is asserted. If the register value stores a floating point operand or result, one of the floating point bits is asserted. The type bits are discussed in more detail below in reference to FIG. 6.

FIG. 6 illustrates one embodiment of type bits 504. In the illustrated embodiment, type bits 504 include a normal bit, a zero bit, an infinity bit, an SNAN bit, a QNAN bit, an invalid bit, a denormal bit, and a multimedia (MMX) bit. As discussed above, if the register value associated with the type bit stores a multimedia operand or result, the multimedia (MMX) bit is asserted. If the register values stores a floating point number, then one of the floating point types is asserted. In the illustrated embodiment, a floating point number may be classified as either normal, zero, infinity, SNAN, QNAN, denormal or invalid. An invalid number is a number with a bit representation that does not represent a valid floating point number. Special encodings exist for a floating point zero and floating point infinity. The zero bit or infinity bit is asserted if the register value contains these special encodings. SNAN and QNAN are encodings that do not represent a number. When reclassifier 91 reclassifies the registers within register storage 84, reclassifier 91 classifies the bit pattern stored in the register as one of the floating point types.

Figure 7:
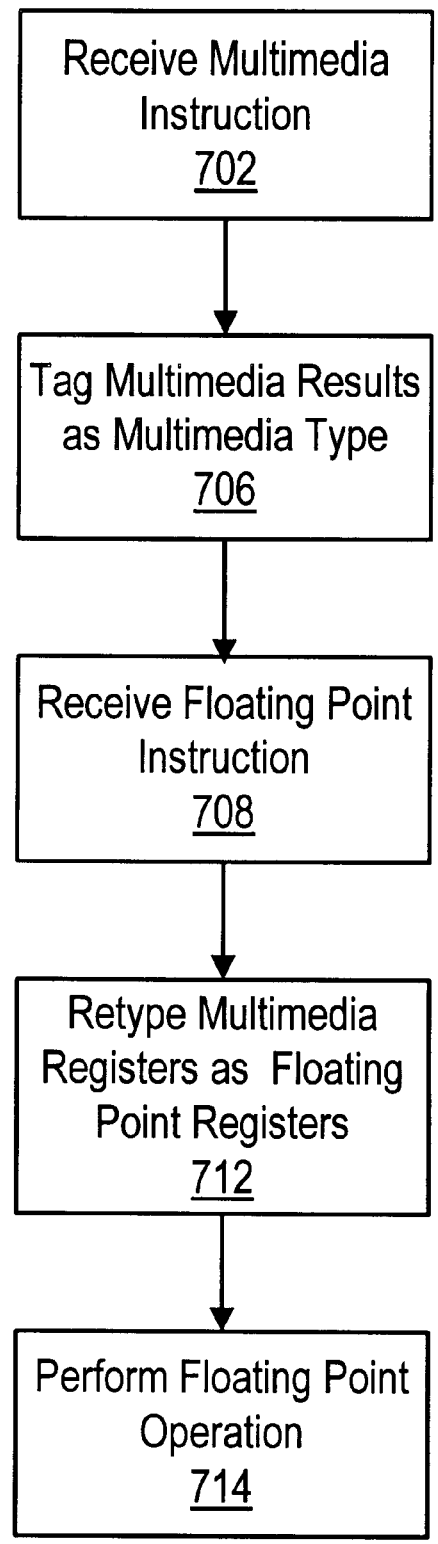
FIG. 7 is a flowchart of the operation of one embodiment of a floating point unit illustrating the handling of special floating point numbers.

Turning now to FIG. 7, a flowchart diagram illustrates the typing of registers within the FPU/MMX unit. In step 702, a multimedia instruction is received subsequent to a floating point instruction. In step 706, results of multimedia operations are typed as multimedia types when stored to registers. In step 708, a floating point instruction or EMMS instruction is received subsequent to the multimedia instruction. In step 712, a retyping routine is performed. The retyping routine reclassifies registers typed as multimedia type as floating point types. In other words, the retyping routine reads the type of each register. If the type identifies the register as a multimedia type, the retyping routine reclassifies the contents of the register interpreted as floating point data. In step 714, the floating point operation specified by the floating point instruction received in step 708 is performed.

Figure 8:
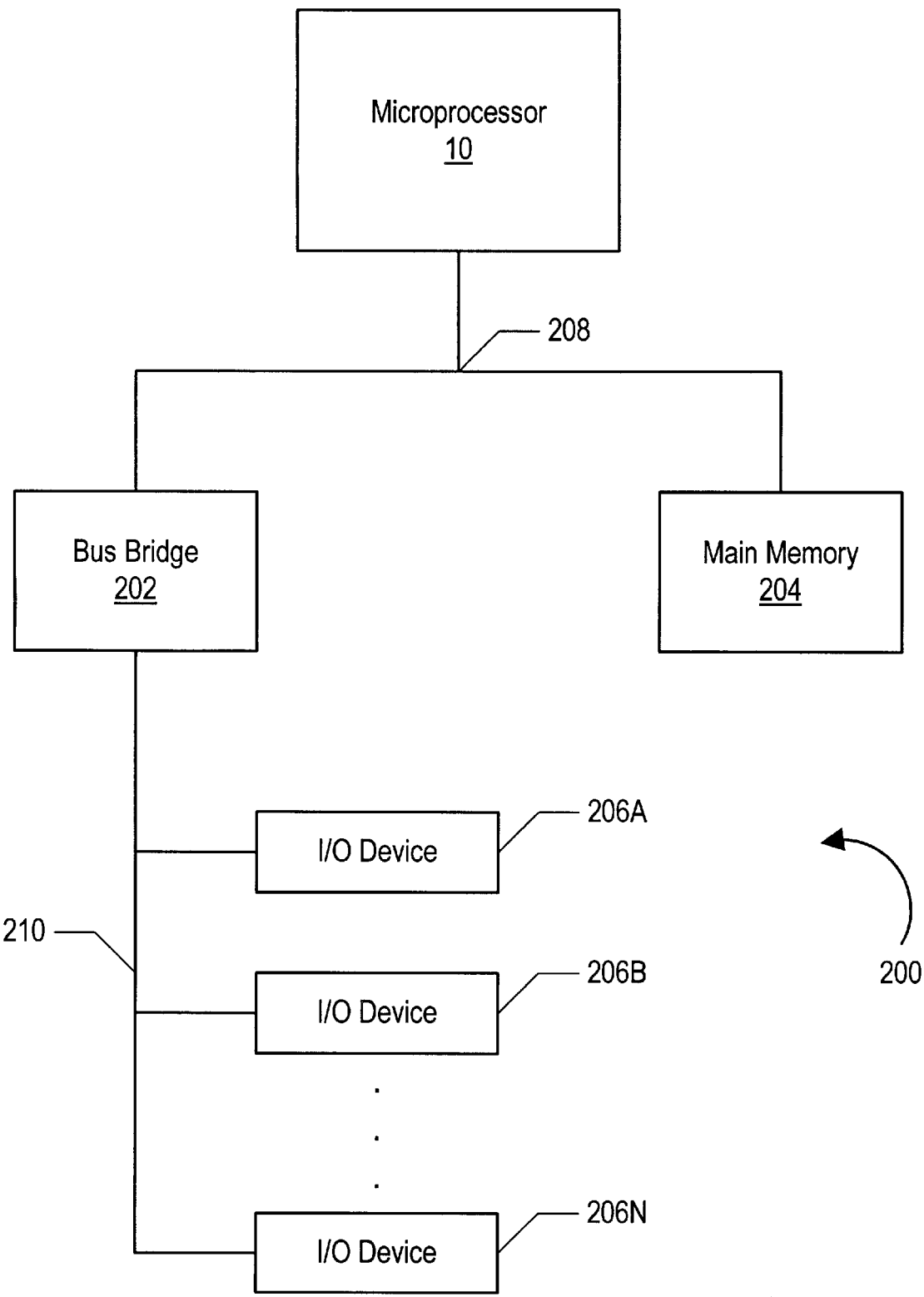
FIG. 8 is a block diagram of one embodiment of a computer system including the microprocessor shown in FIG. 1.

Turning now to FIG. 8, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 8 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fastpath, double dispatch, and MROM instructions for one embodiment of microprocessor 10 employing the x86 instruction set:

TABLE 1 x86 Fastpath, Double Dispatch, and MROM Instructions

| X86 Instruction | Instruction Category |
| --- | --- |
| AAA | MROM |
| AAD | MROM |
| AAM | MROM |
| AAS | MROM |
| ADC | fastpath |
| ADD | fastpath |
| AND | fastpath |
| ARPL | MROM |
| BOUND | MROM |
| BSF | fastpath |
| BSR | fastpath |
| BSWAP | MROM |
| BT | fastpath |
| BTC | fastpath |
| BTR | fastpath |
| BTS | fastpath |
| CALL | fastpath/double dispatch |
| CBW | fastpath |
| CWDE | fastpath |
| CLC | fastpath |
| CLD | fastpath |
| CLI | MROM |
| CLTS | MROM |
| CMC | fastpath |
| CMP | fastpath |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fastpath |
| DIV | MROM |
| ENTER | MROM |
| HLT | MROM |
| IDIV | MROM |
| IMUL | double dispatch |
| IN | MROM |
| INC | fastpath |
| INS | MROM |
| INSB | MROM |
| INSW | MROM |
| INSD | MROM |
| INT | MROM |
| INTO | MROM |
| INDV | MROM |

TABLE 1-continued x86 Fastpath, Double Dispatch, and MROM Instructions

| X86 Instruction | Instruction Category |
| --- | --- |
| INVLPG | MROM |
| IRET | MROM |
| IRETD | MROM |
| Jcc | fastpath |
| JCXZ | double dispatch |
| JECXZ | double dispatch |
| JMP | fastpath |
| LAHF | fastpath |
| LAR | MROM |
| LDS | MROM |
| LES | MROM |
| LFS | MROM |
| LGS | MROM |
| LSS | MROM |
| LEA | fastpath |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fastpath |
| MOVCC | fastpath |
| MOV.CR | MROM |
| MOV.DR | MROM |
| MOVS | MROM |
| MOVSB | MROM |
| MOVSW | MROM |
| MOVSD | MROM |
| MOVSX | fastpath |
| MOVZX | fastpath |
| MUL | double dispatch |
| NEG | fastpath |
| NOP | fastpath |
| NOT | fastpath |
| OR | fastpath |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fastpath/double dispatch |
| PUSHA | MROM |
| PUSHAD | MROM |
| PUSHF | fastpath |
| PUSHFD | fastpath |
| RCL | MROM |
| RCR | MROM |
| ROL | fastpath |
| ROR | fastpath |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fastpath |
| SAL | fastpath |
| SAR | fastpath |
| SHL | fastpath |
| SHR | fastpath |

TABLE 1-continued x86 Fastpath, Double Dispatch, and MROM Instructions

| X86 Instruction | Instruction Category |
| --- | --- |
| SBB | fastpath |
| SCAS | double dispatch |
| SCASB | MROM |
| SCASW | MROM |
| SCASD | MROM |
| SETcc | fastpath |
| SGDT | MROM |
| SIDT | MROM |
| SHLD | MROM |
| SHRD | MROM |
| SLDT | MROM |
| SMSW | MROM |
| STC | fastpath |
| STD | fastpath |
| STI | MROM |
| STOS | MROM |
| STOSB | MROM |
| STOSW | MROM |
| STOSD | MROM |
| STR | MROM |
| SUB | fastpath |
| TEST | fastpath |
| VERR | MROM |
| VERW | MROM |
| WBINVD | MROM |
| WRMSR | MROM |
| XADD | MROM |
| XCHG | MROM |
| XLAT | fastpath |
| XLATB | fastpath |
| XOR | fastpath |

Note: Instructions including an SIB byte are also considered double dispatch instructions. Furthermore, floating point instructions are considered to be MROM instructions.

Numerous variations and modifications will become apparent to those skilled in the art once the above disclosure is fully appreciated. It is intended that the following claims be interpreted to embrace all such variations and modifications.

What is claimed is:

1. A floating point and multimedia unit comprising:

a register storage device including a register field configured to store a register value and a type field configured to store a type value indicative of whether said register value is multimedia data or floating point data;

a floating point core coupled to said register storage device configured to execute floating point instructions, wherein said floating point core is configured to receive a floating point operand from said register storage device and to store a floating point result to said register storage device;

a multimedia core coupled to said register storage device configured to execute multimedia instructions, wherein said multimedia core is configured to receive a multimedia operand from said register storage device and to store a multimedia result to said register storage device; and a re-classifier coupled to said register storage device, wherein said re-classifier is configured to re-classify said type value upon receiving a floating point instruction if said register field contains multimedia data stored by one or more multimedia instructions, wherein said re-classify occurs before said floating point instruction reads said register field and is based on a bit pattern of said register value.

2. The floating point and multimedia unit of claim 1 wherein said type value is further configured to indicate whether said register field is empty and is set to indicate said register field is non-empty when a multimedia instruction is executed, which converts said register storage device from a register stack to a register file.

3. The floating point and multimedia unit of claim 1 wherein said type field includes a valid bit indicative of whether said register field is empty or non-empty and a type value indicative of a type of said register value stored in said register field.

4. The floating point and multimedia unit of claim 3 wherein said type of said register value includes floating point normal, floating point special and multimedia type.

5. The floating point and multimedia unit of claim 4 wherein said valid bit and said type value are configured to be used to derive a tag word indicative of whether said register value is valid, empty, special or zero.

6. The floating point and multimedia unit of claim 5 wherein said tag word is configured to indicate said register value is valid if said register field is non-empty and marked as multimedia type.

7. The floating point and multimedia unit of claim 1 wherein said re-classifier is configured to re-classify said register value marked as said multimedia type as a floating point special type or a floating point normal type.

8. The floating point and multimedia unit of claim 7 wherein said valid bit is configured to indicate whether said register field is empty prior to executing said floating point instruction.

9. The floating point and multimedia unit as recited in claim 1, wherein said reclassifier is configured to reclassify said type value from a multimedia data type value to a special floating point data type that causes said floating point instruction to trap to a special error handling routine.

10. A floating point and multimedia unit comprising:

a register storage device including a register field configured to store a register value and a type field configured to store a valid bit indicative of whether said register field is empty and a type value indicative of whether said register value stored in said register field is multimedia data or floating point data;

a floating point core coupled to said register storage device configured to execute floating point instructions, wherein said floating point core is configured to receive a floating point operand from said register storage device and to store a floating point result to said register storage device;

a multimedia core coupled to said register storage device and configured to execute multimedia instructions wherein said multimedia core is configured to receive a multimedia operand from said register storage device and configured to store a multimedia result to said register storage device; and a re-classifier coupled to said register storage device; wherein:

said valid bit is configured to indicate said register field is non-empty when a multimedia instruction is executed subsequent to a floating point instruction, said type value is configured to indicate said multimedia data type when a result of a multimedia instruction is stored in said register field, and said re-classifier is configured to reclassify said type value after receiving a floating point instruction that follows a multimedia instruction, wherein said re-classifier is configured to reclassify said type value to indicate floating point data based on a bit pattern of said register value if said register field contains multimedia data, wherein said reclassify occurs before said one of said floating point instructions read said register field.

11. The floating point and multimedia unit of claim 9 wherein said re-classifier is configured to re-classify said type value marked as multimedia type as a floating point special type or a floating point normal type.

12. The floating point and multimedia unit of claim 11 wherein said valid bit is configured to indicate said register field is empty prior to executing said floating point instruction.

13. The floating point and multimedia unit as recited in claim 10, wherein said reclassifier is configured to re-classify said type value from a multimedia data type value to a special floating point data type that causes said floating point instruction to trap to a special error handling routine, wherein said special floating point data type is infinity.

14. A method for identifying data stored in a register device, wherein said register device includes a register field to store data and a type field to store a value indicative of either a multimedia data type or a floating point data type, and wherein the register device is adapted to store results from multimedia and floating point instructions, said method comprising:

classifying said value in the type field to indicate said multimedia data type when a multimedia instruction stores a result in the register field;

receiving a floating point instruction;

reclassifying said value in said type field to indicate said floating point data type based on bit patterns of said multimedia instruction result that is stored in said register field; and executing said floating point instruction subsequent to said reclassifying.

15. The method for correctly typing registers of claim 14 further comprising:

marking registers as non-empty, whereby a register stack for storing floating point operands and results is converted to a register file for storing multimedia operands and results.

16. The method for correctly typing registers of claim 14 wherein said floating point type includes floating point normal and floating point special.

17. The method for correctly typing registers of claim 16 wherein said floating point special type includes zero, infinity and not-a-number.

18. The method for correctly typing registers of claim 16 further comprising marking registers as empty when a floating point instruction is executed, whereby said register stack for storing said floating point operands and results is converted to a register stack.

19. The method as recited in claim 14, wherein said reclassifying said value in said type field includes reclassifying said value to indicate a special floating point data type, wherein said special floating point data type causes said floating point instruction to trap to a special error handling routine.

* * * * *